(12) United States Patent
Navarro et al.

(10) Patent No.: US 6,976,867 B2
(45) Date of Patent: Dec. 20, 2005

(54) NETWORK CONNECTION SENSING ASSEMBLY

(75) Inventors: Jordi Gatnau Navarro, Barcelona (ES); Antoni Puell Olle', Barcelona (ES); Ralph Sykes Martin, Mount Airy, NC (US); Paul John Pepe, Clemmons, NC (US)

(73) Assignee: Tyco Electronics AMP Espana, S.A., Barcelona (ES)

( * ) Notice: Subject to any disclaimer, the term of this patent is extended or adjusted under 35 U.S.C. 154(b) by 24 days.

(21) Appl. No.: 10/766,254

(22) Filed: Jan. 28, 2004

(65) Prior Publication Data

US 2004/0192094 A1 Sep. 30, 2004

Related U.S. Application Data

(63) Continuation-in-part of application No. 10/289,570, filed on Nov. 7, 2002, now Pat. No. 6,626,697.

(60) Provisional application No. 60/453,801, filed on Mar. 11, 2003.

(51) Int. Cl.[7] .............................................. H01R 3/00
(52) U.S. Cl. ..................................................... 439/489
(58) Field of Search ................................ 439/489, 490, 439/491, 676, 189, 188; 340/568.2

(56) References Cited

U.S. PATENT DOCUMENTS

| | | | | |
|---|---|---|---|---|
| 4,237,386 A | * | 12/1980 | Instance | ..................... 307/116 |
| 5,178,554 A | * | 1/1993 | Siemon et al. | .............. 439/188 |
| 5,347,095 A | * | 9/1994 | Zeder | ...................... 200/51.09 |
| 5,434,558 A | * | 7/1995 | Zeder | ...................... 340/568.3 |
| 5,483,467 A | * | 1/1996 | Krupka et al. | .............. 709/200 |
| 5,870,626 A | * | 2/1999 | Lebeau | ........................ 710/11 |
| 6,626,697 B1 | * | 9/2003 | Martin et al. | ................ 439/488 |

* cited by examiner

Primary Examiner—Phuong Dinh

(57) ABSTRACT

A connector assembly includes a housing having a jack interface. The jack interface has a receptacle jack therein, and the receptacle jack is configured to receive a plug. A sensor bezel is removably attachable to the jack interface, and the sensor bezel comprises a cavity extending therethrough to allow passage of a plug when inserted into the receptacle jack. The sensor bezel includes a circuit board proximate the jack cavity. At least one sensor contact is aligned with, and configured to engage, a sensor probe associated with a plug insertable into the receptacle jack. An interchangeable output cassette provides an output signal through the front or the rear of the connector assembly.

20 Claims, 6 Drawing Sheets

NETWORK CONNECTION SENSING ASSEMBLY

CROSS REFERENCE TO RELATED APPLICATIONS

This application claims the benefit of U.S. Provisional Application Ser. No. 60/453,801 filed Mar. 11, 2003, which is hereby incorporated by reference in its entirety, and this application is a continuation-in-part application of U.S. patent application Ser. No. 10/289,570 filed Nov. 7, 2002, which is also hereby incorporated by reference in its entirety.

BACKGROUND OF THE INVENTION

The present invention generally relates to a connector that connects electronic components in a network and, more particularly, relates to an interconnect module or cassette that connects network components to a sensor component.

In order to better operate large electronic networks, sensor systems have been developed to monitor connections between components within the network. The sensor system typically includes an interconnect module that is retained in a patch panel, or any number of other network structures, and interconnects two separate network components. The interconnect module includes receptacle jacks, such as modular jacks, at a mating face. These jacks receive patch cords that in turn are connected to a first network component. Each patch cord includes an electrical cable comprised of signal wires connected to a plug at one end. The plug is received within a corresponding receptacle jack such that the signal wires in the electrical cable are electrically connected to signal contacts extending from a rear side of the interconnect module. The signal contacts are in turn connected to a second set of signal wires that extend to a second network component. Thus, the interconnect module electrically interconnects the first and second network components.

Conventional interconnect modules are joined with separate sensor configurations that enable the network to determine when a plug is joined with a receptacle jack. FIGS. 5 and 6 illustrate a conventional interconnect module 600 in combination with a conventional sensor configuration. The sensor configuration includes a separate flexible etched circuit (FEC) 602 containing several sensor contacts 604 arranged on a strip 606. The strip 606 is glued to the face plate 608 near the receptacle jacks 610. Traces extend from each sensor contact 604 along the length of the FEC 602 across the front of the face plate 608 to a first connector 612 that extends from a side of the interconnect module 600. The first connector 612 is then connected to a second connector (not shown) that is connected to a sensor component (not shown). Alternatively, the first connector 612 may be positioned to extend from the rear side of the interconnect module 600 instead of from the front side.

Each plug includes a sensor probe connected to a sensor wire that carries signals between the sensor probe and an associated network component. When the plugs are fully inserted into the receptacle jacks the sensor probes contact and electrically engage the sensor contacts 604 on the FEC 602 to create a sensor circuit. The sensor component may then be used to monitor and record the connections of network components throughout the network. For example, if one network component is connected to the wrong server, a network shutdown or outage may occur which could be very costly. The sensor component determines where the faulty connection is located and determines how long it has existed in order that the outage may be quickly remedied. Additionally, the sensor component may be used to determine whether unauthorized parties are connected to a component within the network and thus improve network security.

However, the conventional interconnect module 600 suffers from several drawbacks. The FEC 602 is expensive and attaching the FEC 602 to the interconnect module 600 requires the use of adhesives and registration of the sensor contacts 604 proximate each receptacle jack 610. The process of installing the FEC 602 is thus time consuming and difficult, especially when the interconnect module 600 is located in a space-constrained network structure. Also, the first connector 612 is typically connected to the FEC 602 while the FEC 602 is attached to the interconnect module 600. The second connector hangs from the front side of the interconnect module 600 and is thus easily damaged during installation and use. Also, the second connector takes up a great deal of space which renders the interconnect module 600 difficult to install in space-constrained network structures. The interconnect module 600 requires cables and a second connector to connect the first connector 612 to the sensor component. The connectors and cables take up space and increase the risk of an unintentional disconnection and also limit the adaptability of the interconnect module 600 by presenting a more complicated structure of components to consider when adding or changing connections. In addition, the cables preferably should be selected at the time of installation of the FEC 602 to have a fixed length in order that loops of extra cable are not situated at the patch panel. Further, if any receptacle jack 610 needs to be removed or added, the entire FEC 602, which covers a portion of the receptacle jacks 610, has to be removed and replaced. Also, positioning the first connector 612 to extend to the rear side of the interconnect module 600 requires a difficult and expensive mechanical routing process that requires removal or modification of components already on the rear side of the interconnect module 600.

A need remains for an interconnect module that overcomes the above problems and addresses other concerns experienced in the prior art.

BRIEF DESCRIPTION OF THE INVENTION

In accordance with an exemplary embodiment of the invention, a connector assembly is provided. The connector assembly comprises a housing comprising a jack interface. The jack interface has a receptacle jack therein, and the receptacle jack is configured to receive a plug. A sensor bezel is removably attachable to the jack interface, and the sensor bezel comprises a cavity extending therethrough to allow passage of a plug when inserted into the receptacle jack. The sensor bezel includes a circuit board proximate the jack cavity. At least one sensor contact is aligned with, and configured to engage, a sensor probe associated with a plug insertable into the receptacle jack.

In accordance with another exemplary embodiment of the invention, an interconnect cassette is provided. The interconnect cassette is configured to electrically communicate with a network component and a sensing component, and the interconnect cassette comprises a housing comprising a jack interface. The jack interface has a plurality of receptacles formed therein, and each of the plurality of receptacles is configured to receive a plug of a patch cord. A sensor bezel is removably attachable to the jack interface, and the sensor bezel is configured to engage the jack interface and have at least one cavity extending therethrough to allow passage of a plug when inserted into one of the receptacles. The sensor bezel includes a circuit board and a plurality of sensor contacts electrically connected to the circuit board. Each of the sensor contacts are aligned with, and are configured to engage, a sensor probe associated with a plug insertable into the receptacle.

In accordance with another exemplary embodiment of the invention, a sensor bezel is provided. The sensor bezel is configured to be removably secured to a network connection component having a plurality of receptacle jacks formed therein, aligning with, and configured to engage sensor probes associated with plugs which may be inserted into one of the receptacle jacks. The sensor bezel comprises a circuit board, a bezel holding the circuit board, at least one jack cavity proximate the circuit board, a plurality of sensor contacts configured to be positioned proximate respective receptacle jacks, and an interchangeable output cassette generating a signal dependant upon the connections to the receptacle jacks.

The output cassette may be configured to generate an output signal through the front of the sensor bezel, or from the rear of the network component as desired. The circuit board includes a card edge connector for convenient connection to interchangeable output cassettes as desired. The sensor contacts in an exemplary embodiment are metallic plates located between the sensor bezel and a jack interface of the network component to facilitate accurate and reliable sensing of connections.

Figure 1:
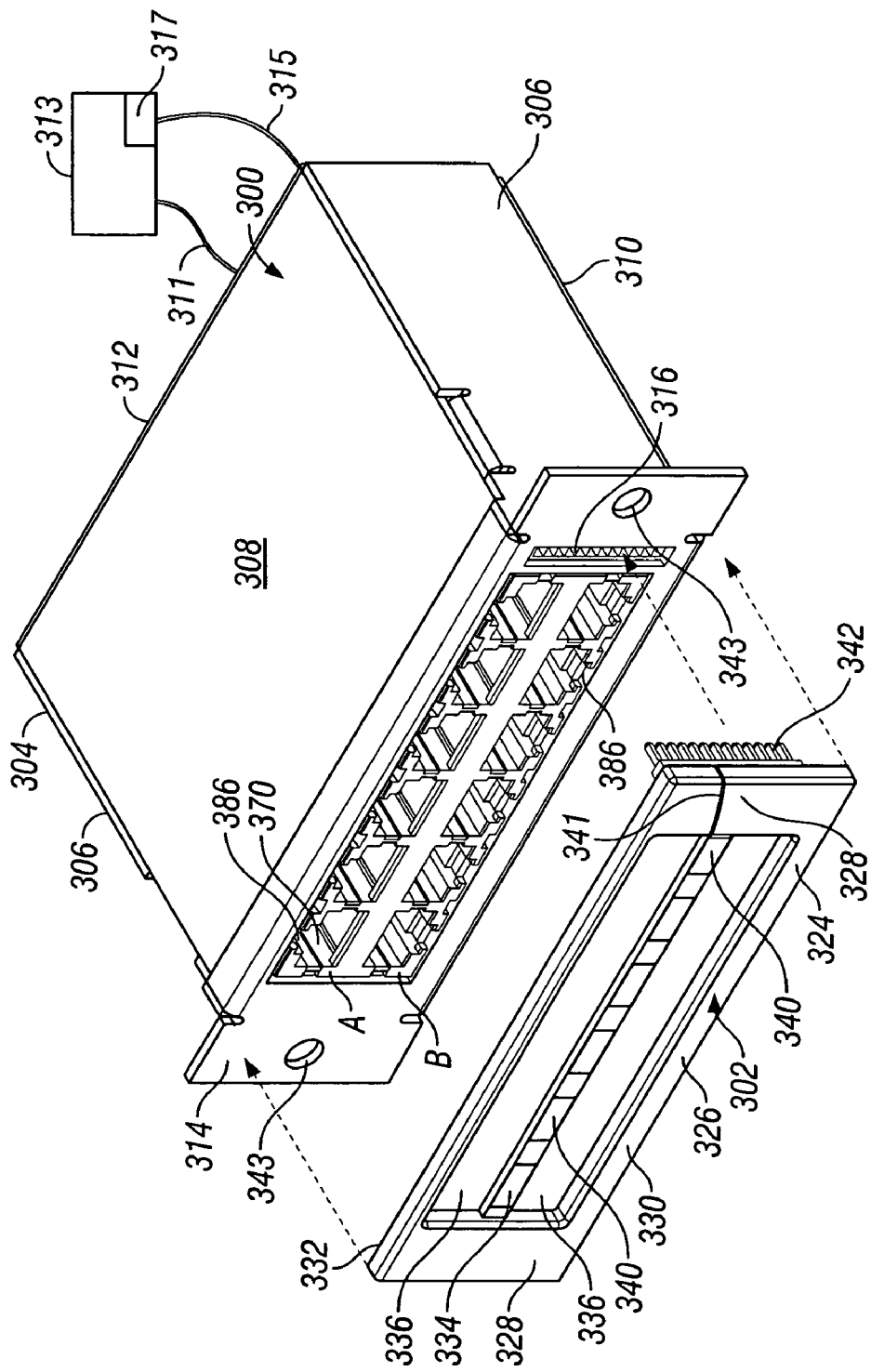
FIG. 1 illustrates a front isometric view of an interconnect cassette configured to be mated with a sensor strip assembly according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a front isometric view of an interconnect cassette 300 configured to be mated with a separate and discrete sensor strip assembly 350 according to an embodiment of the present invention. The interconnect cassette 300 includes a housing 304 defined by side walls 306, a top surface 308, a base 310, a rear wall 312 and a jack interface 314. The jack interface 314 includes a plurality of receptacle jacks 370 and sensor strip pin receptacles 316 positioned to the side of the receptacle jacks 370. The receptacle jacks 370 each have a channel 386 along one side thereof and are configured to receive plugs 18 (as shown in FIG. 2) on patch cords 10.

Figure 2:
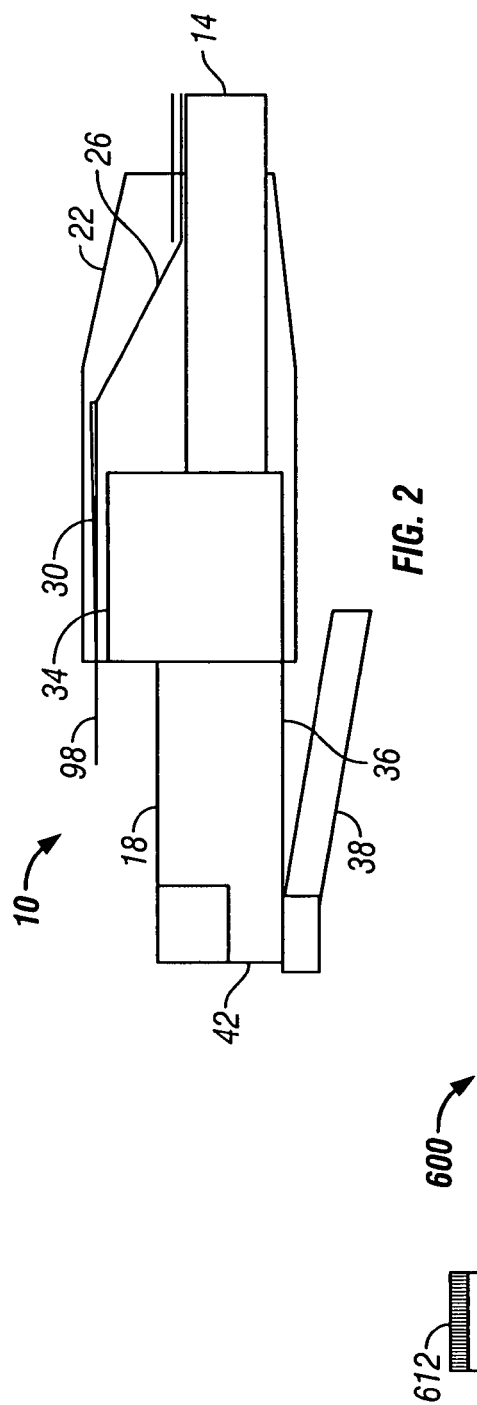
FIG. 2 illustrates a side sectional view of a portion of a patch cord formed in accordance with an embodiment of the present invention.

FIG. 2 illustrates a side sectional view of a portion of a patch cord 10 formed according to an embodiment of the present invention. The patch cord 10 includes an insulated cable 14 and a plug 18 retained in a boot 22. The cable 14 extends to a first network component (not shown) that, by way of example only, may be a server, interconnect module or another interconnect cassette 300. The cable 14 contains several signal wires (not shown) that may, by way of example only, be shielded or unshielded and made of fiber optics or copper. A probe wire 26 extends from the cable 14 to a sensor probe 30. The sensor probe 30 may be positioned generally parallel to a longitudinal axis of the plug 18. The sensor probe 30 has a probe head 98 extending outward from the boot 22. A flexible prong 38 extends from a front end 42 of the plug 18 rearward at an acute angle with respect to a bottom surface 36 of the plug 18 and is configured to retain the plug 18 within the interconnect cassette 300.

Referring again to FIG. 1, the receptacle jacks 370 are arranged in two rows (A and B) each having six receptacle jacks 370. Rows A and B of receptacles jacks 370 are stacked. Optionally, the jack interface 314 may have more or less than two rows of receptacle jacks 370. Further, more or less than six receptacle jacks 370 may be included within each row. Additionally, the sensor strip pin receptacles 316 may be positioned above or below the rows A and B of receptacle jacks 370 depending on the location of the sensor strip pins 342 on the sensor bezel 302.

The interconnect cassette 300 may be connected to a network connection component such as a patch panel, a wall mounted box, a floor box, or any number of other network connection structures (not shown). Mounting features, such as fastener holes 343, are provided in the jack interface 314 to allow the interconnect cassette 300 to be mounted into a rack unit (not shown) or other such organizational and support structure. The interconnect cassette 300 connects the receptacle jacks 370 to corresponding wires, a printed circuit board, a flexible circuit, a lead frame, or the like within the housing of the interconnect cassette 300 as opposed to directly connecting each receptacle jack 370 to a corresponding structure within another network connection. The wires electrically connected to the receptacle jacks 370 may be bundled inside the interconnect cassette 300 and electrically connected to a signal input/output (I/O) interface 320 (as shown below with respect to FIGS. 3 and 4). The signal I/O interface 320 may then be connected to a cable or other connection route (such as cable 311), which in turn is electrically connected to a network component or connection 313, such as a patch panel. Because the wires from the receptacle jacks 370 are bundled within the interconnect cassette 300 and subsequently routed to corresponding features in the signal I/O interface 320 within the interconnect cassette 300, there is no need to route numerous cables and wires from the interconnect cassette 300 to the network component 313. Rather, a single cable, such as cable 311, may house a plurality of wires and connect the interconnect cassette 300 to the network connection 313. Optionally, the receptacle jacks 370 may be electrically connected to a flexible or printed circuit board (not shown in FIG. 1) within the interconnect cassette 300 that is, in turn, electrically connected to a signal input/output interface 320 located at the front or rear of the interconnect cassette 300. An assembly of this type is described below in relation to FIG. 7.

As illustrated in FIG. 1, the sensor bezel 302 includes a frame 324 defined by horizontal frame members 326 formed integrally with vertical frame members 328. The frame 324 includes a front face 330, a cassette interface surface 332 and a column of strip pins 342 located on one of the vertical frame members 328. Portions of the cassette interface surface 332 (for example, the edges of the cassette interface surface 332) may be beveled, notched or ribbed such that the cassette interface surface 332 engages corresponding structures in the jack interface 314 to allow the sensor bezel 302 to be snapably, latchably, removably, or otherwise securably retained by the jack interface 314 of the interconnect cassette 300. Optionally, the sensor bezel 302 may be securably retained by the interconnect cassette 300 without the use of glue or other such adhesives.

The strip pins 342 extend outwardly from the cassette interface surface 332 and may optionally be formed on one of the horizontal frame members 326 (as a row) or on the other vertical frame member 328. Also, optionally, strip pins 342 may be positioned on more than one of the vertical and horizontal frame member 328 and 326 (so long as they correspond to strip pin receptacles formed within the interconnect cassette 300). A sensor strip 334, attached to each vertical frame member, spans longitudinally across the sensor bezel 302 in a parallel relationship with the horizontal frame members 326. The sensor bezel 302 may be molded with, stamped onto, or otherwise integrally formed with the frame 324. Alternatively, the horizontal frame members 328 may include slots configured to receive and retain support tabs formed as terminal ends of the sensor strip. That is, the sensor strip 334 may be removable from the frame 324. Two open jack cavities 336 are defined between the horizontal frame members 326 and the sensor strip 334 and are configured to allow plugs 18 to pass therethrough. The jack cavities 336 allow plugs 18 of the patch cords 10 to mate with the receptacle jacks 370 as described below.

Figure 5:
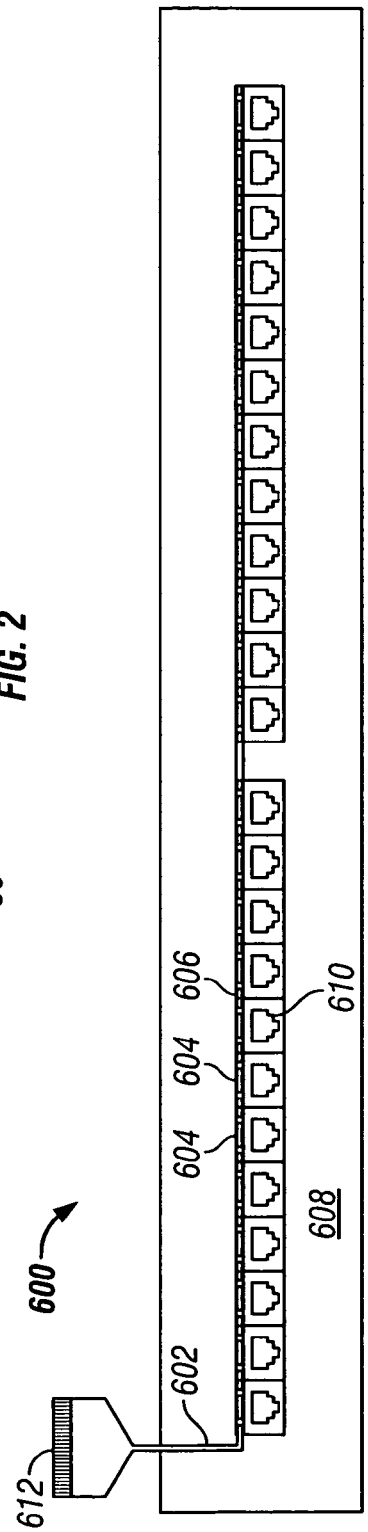
FIG. 5 illustrates a front view of a conventional interconnect module with a flexible etched circuit mounted thereto.
Figure 6:
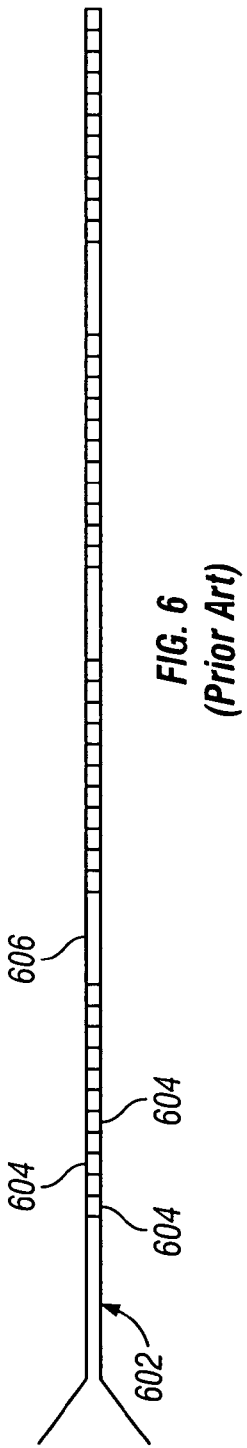
FIG. 6 illustrates a front view of a conventional flexible etched circuit.

As shown in FIG. 1, the sensor strip 334 is a flexible circuit having conducting pads or sensor contacts 340, as commonly used as a connection sensor with interconnect modules (such as interconnect module 600 shown in FIG. 5). The sensor contacts 340 are electrically connected to corresponding strip pins 342 extending outwardly from the cassette interface surface 332. The sensor contacts 340 may be electrically connected to the corresponding strip pins through traces (an exemplary trace, which is under the surface of the sensor strip 334 and vertical member 328, is shown by line 341) that may be formed within or on the sensor strip 334 and the frame 324.

The sensor bezel 302 is received and retained by the interconnect cassette 300. The interconnect cassette 300 includes features that allow the strip assembly 350 to snapably, latchably or otherwise securably mount to the jack interface 314 of the interconnect cassette 300. The sensor bezel 302 is mounted to the interconnect cassette 300 without the use of glue or other such adhesives. The sensor bezel 302 may be quickly and efficiently mounted to (and removed from) the interconnect cassette 300 through snapable, latchable or other such matable engagement between the jack interface 314 and the cassette interface surface 332. Also, the strip pins 342 may be securably retained by the strip pin receptacles 316 so that the strip assembly 350 is securably positioned on the jack interface 314 of the inter-connect cassette 300. As the sensor bezel 302 is mounted to the jack interface 314 in the direction of the dashed lines, the strip pins 342 are received and retained by the strip pin receptacles 316. The strip pins 342 are then electrically connected to contacts (not shown) within the strip pin receptacles 316, which are in turn electrically connected to a sensor input/output (I/O) interface 318 or insulated displacement contact (DC) assembly 322 (as discussed below with respect to FIGS. 3 and 4) through internal traces, wires, or the like. The sensor I/O interface 318 or DC assembly 322 may then be in electrical communication with a sensing component 317 within or discrete from the network component 313 through a cable 315 or other such electrical path.

When the sensor bezel 302 is securably mounted to, and consequently in operative connection with, the interconnect cassette 300, the receptacle jacks 370 may receive the plugs 18 of the patch cords 10 such that the flexible prongs 38 are retained in the channels 386 and biased toward the bottom surface 36 of the plugs 18. The resistance of the flexible prongs 38 against the channels 386 retains the plugs 18 within the receptacle jacks 370. Optionally, the flexible prongs 38 may include a latch feature that joins a corresponding latch feature in the channel 386. When the plugs 18 are fully received in the receptacle jacks 370, the probe heads 98 contact and electrically engage corresponding sensor contacts 340. When the plugs 18 are inserted into corresponding receptacle jacks 370, the sensor probes 30 align with and engage corresponding sensor contacts 340 on the sensor strip 334, thereby enabling sensor signals to pass in either direction between the plug 18 and interconnect cassette 300.

Optionally, instead of a pin and socket configuration, the sensor bezel 302 may be compressibly connected to the interconnect cassette 300. For example, instead of the pins 342 and the receptacles 316, the sensor bezel 302 may include an array of insulators and conductors. The insulators may be longer or higher than the conductors. When the array is sandwiched between the sensor bezel 302 and interconnect cassette 300, however, the insulators may be compressed to the length or height of the conductors.

When the sensor strip 334 is operatively connected to the interconnect cassette 300, a pin or other such element, such as the sensor probe 30, on the plug 18 or patch cord 10 contacts the sensor strip 334 if the plug 18 is fully mated into a corresponding receptacle jack 370. In particular, the sensor probe 30 of the plug 18 contacts a sensor contact 340 when the plug is fully mated into the receptacle jack 370. Upon full mating of the plug 18 into the receptacle jack 370, an electrical circuit is formed between the plug 18 and the sensor contact 340 by virtue of the sensor probe 30 contacting the sensor contact 340. The sensing component 317 detects this electrical circuit as a connection between the plug 18 and its corresponding receptacle jack 370. If, however, the plug 18 becomes dislodged from its corresponding receptacle jack 370, the sensor probe 30 no longer contacts the sensor contact 340. Thus, the electrical circuit is broken and the sensing component 317 senses that a connection is not present between the plug 18 and its corresponding receptacle jack 370. The information regarding connections is relayed to a processing unit (not shown), which in turn may display connection information to an operator or overseer.

Figure 3:
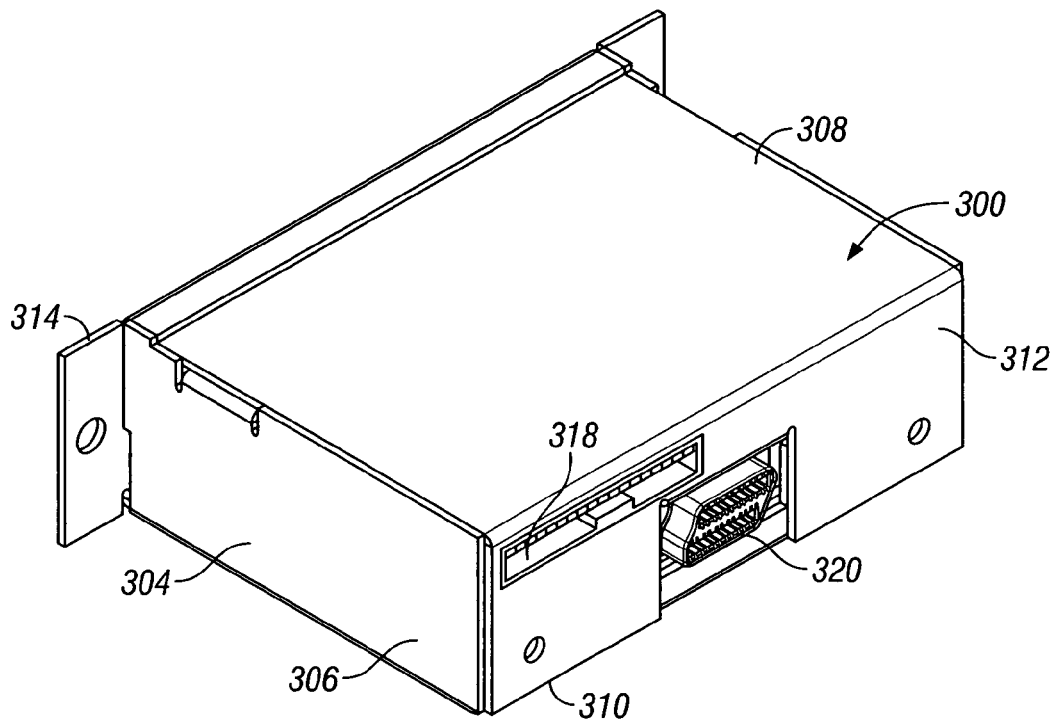
FIG. 3 illustrates a rear isometric view of an interconnect cassette according to an embodiment of the present invention.

FIG. 3 illustrates a rear isometric view of an interconnect cassette 300 according to an embodiment of the present invention. The rear wall 312 of the interconnect cassette 300 includes a sensor input/output (I/O) interface 318 and a signal input/output (I/O) interface 320. The sensor I/O interface 318 electrically connects to the strip pin receptacles 316 through electrical traces, cables, wires, circuit boards or the like. Similarly, the signal (I/O) interface 320 electrically connects to the receptacle jacks 370 through electrical traces, cables, wires, circuit boards or the like. Thus, the interconnect cassette 300 may connect to a patch panel, or other network connection structure, such as network component 313, through an electrical cable, such as cable 311, that bundles a plurality of signal wires and connects them to an I/O interface on the network component 313. Similarly, sensor information is relayed to a sensing component 317 through a cable 315 that connects the sensor I/O interface 318 to an interface on the sensing component 317.

Figure 4:
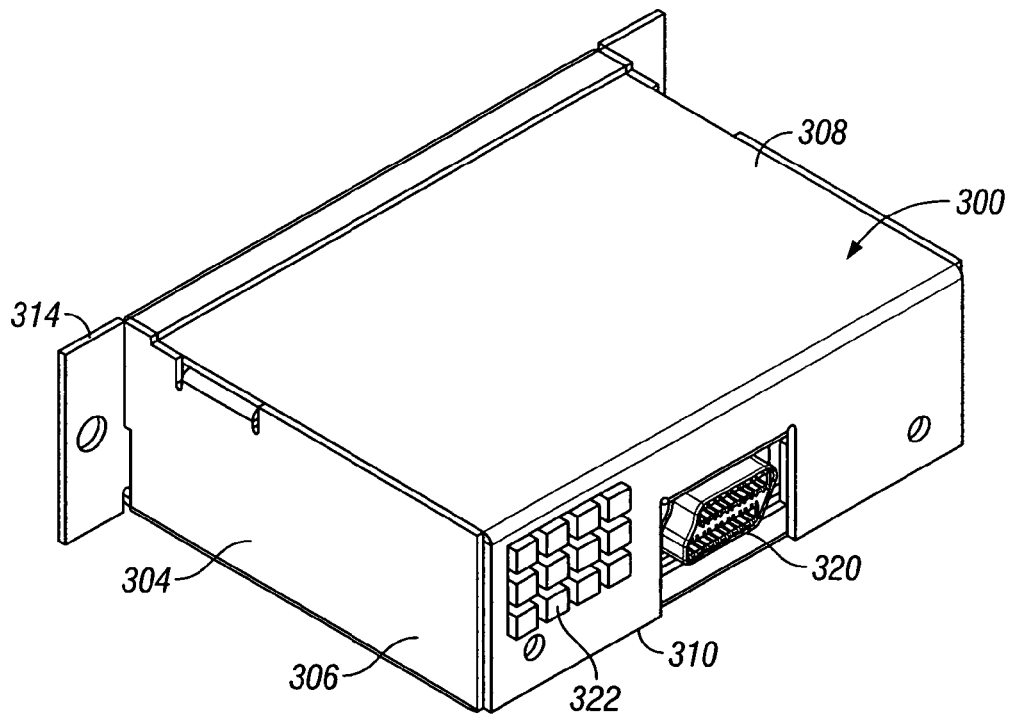
FIG. 4 illustrates a rear isometric view of an interconnect cassette according to an alternative embodiment of the present invention.

FIG. 4 illustrates a rear isometric view of an interconnect cassette 300 according to an alternative embodiment of the present invention. Instead of the sensor interface 318 shown in FIG. 3, the interconnect cassette 300 may include a DC assembly 322 that may communicate with a corresponding assembly of a sensing component 317.

United States patent application entitled Receptacle and Plug Interconnect Module With Integral Sensor Contacts, filed Jun. 18, 2002, attorney docket 17862US 1 (MHM No. 13761US01), listing Pepe et al. as inventors (the Pepe application), discloses a connector assembly having sensor contacts integrally formed with a housing of the connector assembly. The Pepe application is incorporated by reference herein in its entirety. The Pepe application discloses an interconnect module having a plurality of sensor contacts integrally formed thereon. The sensor strip 334 shown above with respect to FIG. 1 may include the sensor contacts shown in the Pepe application, instead of the flexible strip 338. Each contact sensor, or conducting pad of the contact sensor, is electrically connected to the strip pins 342 by way of traces 341 or similar electrical paths.

In an alternative embodiment of the present invention, the sensor strip 334 and the sensor I/O interface 318 or the DC assembly 322 may be connected together by a printed circuit board that extends through the housing 304 of the interconnect cassette 300. The printed circuit board has electronic traces that extend along the length thereof and that are connected to the sensor strip receptacles 316. The printed circuit board may include signal conditioning circuits, an identification code unique to each receptacle jack 370, and/or processing components that analyze and identify the type of plug inserted.

The interconnect cassette 300 and separate sensor bezel 302 confer several benefits. First, the interconnect cassette 300 utilizes individual sensor contacts 340 positioned proximate each receptacle jack 370. The sensor contacts 340 are retained individually within the front face of the sensor bezel 302 and are connected to the sensor pins 342 through traces 341, or the like. Thus, the sensor contacts 340 directly connect to the sensor probes of the plugs 18. The sensor contacts 340 are separate and discrete from one another thereby allowing easy removal and replacement of the plugs 18 from the receptacle jacks 370 without disconnecting other plugs 18 from receptacle jacks 370 that are not being replaced/removed. That is, only the sensor strip 334 needs to be removed, while the sensor bezel 302 and the plugs remain in place. Also, if sensor contacts 34 are faulty, only the sensor bezel 302 needs to be replaced (as opposed to the entire interconnect cassette 300). Further, the sensor strip 334 of the sensor bezel 302 may be removable so that only the sensor strip 334 or individual sensor contacts 340 needs to be replaced. Finally, the sensor contacts eliminate the need for fixed lengths of cable and multiple connectors to connect sensor pads to the sensor wires, thus saving time and space.

Embodiments of the present invention may be used with various applications including modular jacks. For example, the present invention may be used to electrically or fiber optically connect components.

Figure 7:
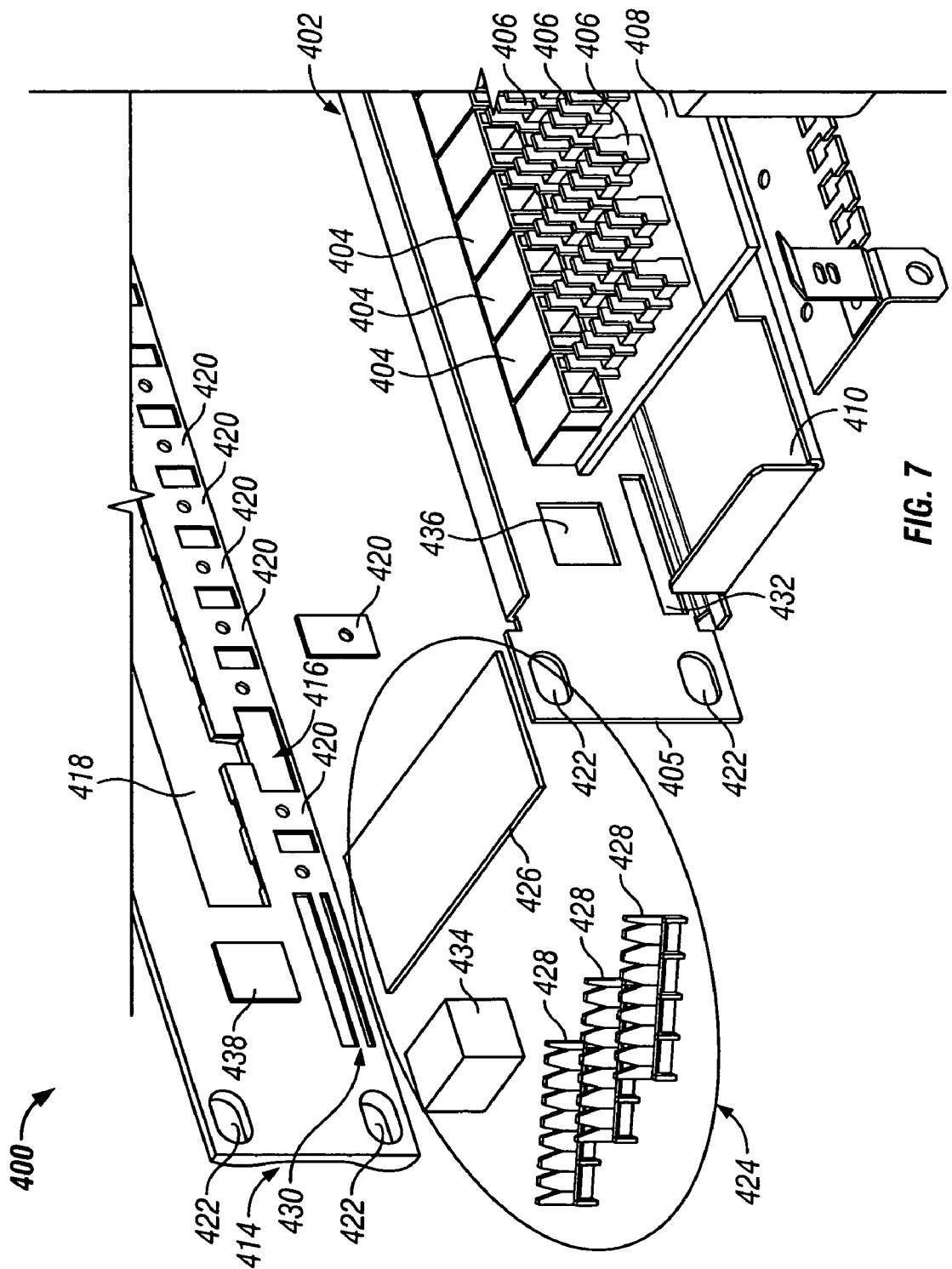
FIG. 7 illustrates a partial exploded view of an interconnect cassette assembly according to an alternative embodiment of the present invention.
Figure 8:
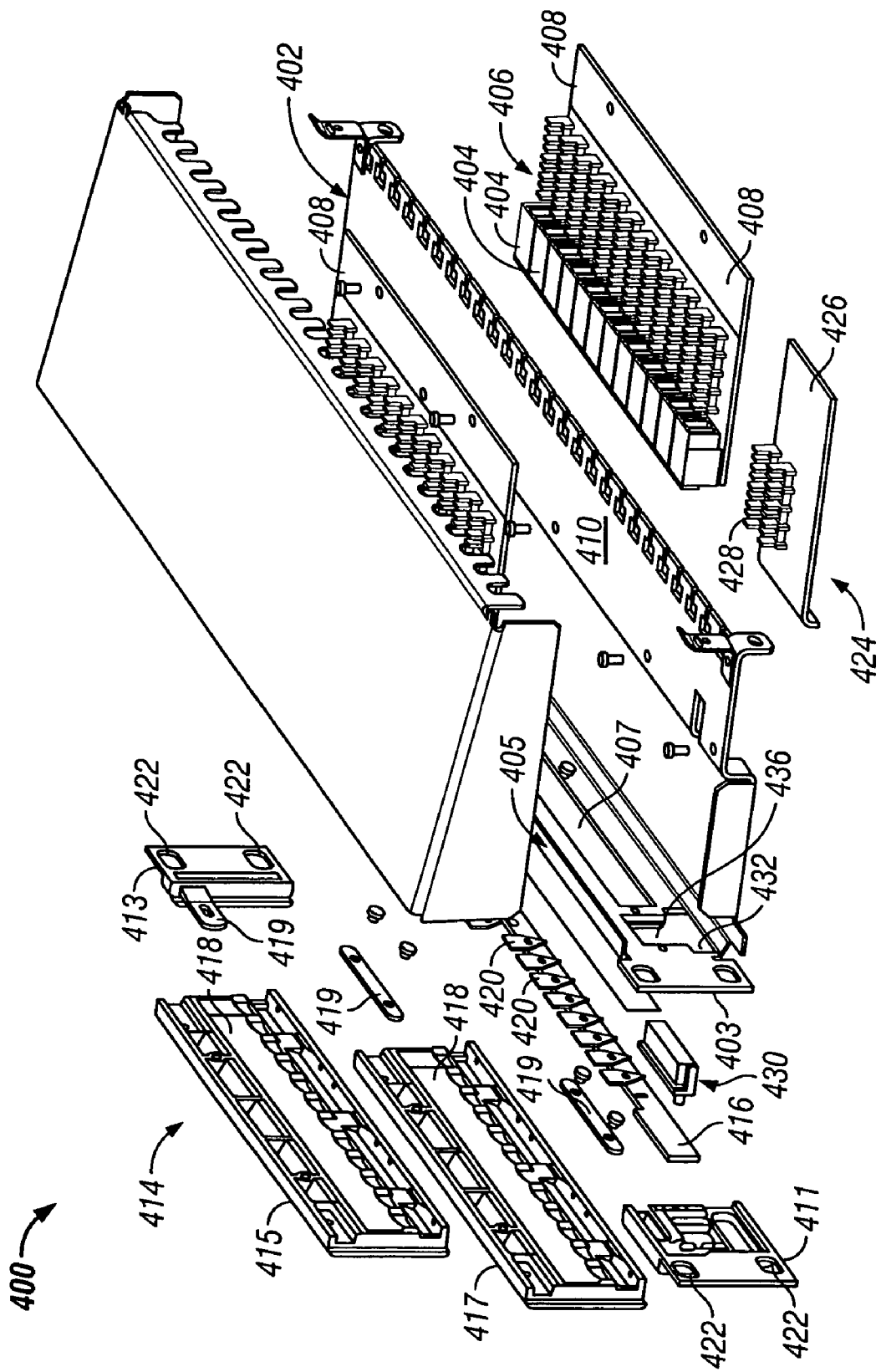
FIG. 8 is a an assembly view of the interconnect cassette assembly shown in FIG. 7.
Figure 9:
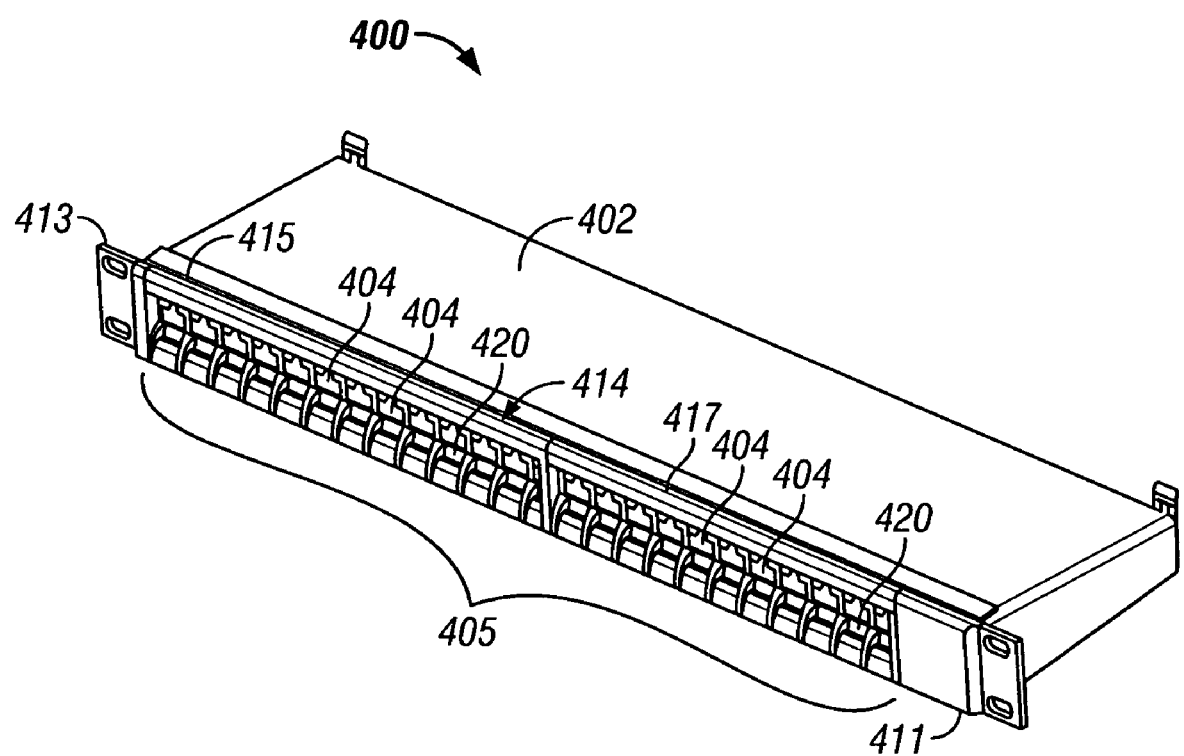
FIG. 9 is a perspective view of the interconnect cassette assembly shown in FIG. 7 in an assembled state.

FIGS. 7–9 illustrate another embodiment of an interconnect cassette assembly 400 including an interconnect cassette 402. Interconnect cassette 402 includes a number of receptacle jacks 404 arranged side-by-side in a horizontal row across a front end 403 of the interconnect cassette and forming a jack interface 405 (FIG. 9). A plurality of connectors 406 are arranged behind each respective receptacle jack 404, and each connector 406 is mechanically and electrically coupled to a respective printed circuit board 408 extending above a bottom wall 410 of the interconnect cassette 402. The receptacle jacks 404 are aligned and positioned such that the front faces of the receptacle jacks 404 are accessible through an open jack cavity 407 (FIG. 8) in the jack interface 405 of the interconnect cassette 402. When a patch cord, such as patch cord 10 (shown in FIG. 2) is received in the open end of a receptacle jack 404, signal wires of the patch cords are electrically connected to the associated printed circuit board, and the sensor probes 30 (shown in FIG. 2) of the patch cords are electrically connected to an interchangeable output cassette 424, described below.

A sensor bezel 414 is coupled to the jack interface 405 of the interconnect cassette 402 and provides sensing capability for monitoring connections thereto. The sensor bezel 414 in an exemplary embodiment is fabricated from a known plastic material and includes an overmolded sensor strip 416 extending longitudinally beneath an open jack cavity 418 formed into the sensor bezel 414. In an illustrative embodiment, the sensor strip 416 is a printed circuit board having electronic traces that extend along the length thereof and that are connected to sensor contacts 420. The printed circuit board 416 may include signal conditioning circuits, an identification code unique to each receptacle jack 404, processing components that analyze and identify the type of plug inserted into the interconnect cassette 402, and the like as those in the art will appreciate. In alternative embodiments, it is appreciated that the sensor strip 416 may include a flexible circuit familiar to those in the art in lieu of a printed circuit board. It is appreciated that the sensor strip 416 may be otherwise mounted to the bezel 414 in lieu of overmolding as described above.

In the illustrated embodiment, the sensor contacts 420 are separately provided metallic plates that are inserted in the sensor bezel 414 in electrical contact with one of the electronic traces on the printed circuit board 416. It is appreciated, however, that other conductive members of various shapes, sizes, and configurations may be employed in alternative embodiments of the invention. Additionally, the sensor contacts 420 may be overmolded or otherwise provided in a unitary or integral arrangement with sensor bezel 414. In still another alternative embodiment, sensor contacts 420 may be coupled to or otherwise provided upon the jack interface 405 of the interconnect cassette 402.

When the sensor bezel 414 is attached to the jack interface 405 of the interconnect cassette 402, the open cavity 418 of the sensor bezel 414 is substantially aligned with and surrounds the open front faces of the receptacle jacks 404. The sensor contacts 420 are located between the printed circuit board 416 of the sensor bezel 414 and the jack interface 405 of the interconnect cassette 402 with each sensor contact 420 located adjacent one of the receptacle jacks 404. When a patch cord, such as patch cord 10 described above, is connected to a receptacle jack 404 through the open cavity 418, a sensor probe 30 contacts a respective one of the sensor contacts 420 corresponding to the connected jack receptacle 404 and enables signals to pass in either direction between the patch cord 10 and the printed circuit board 416 of the sensor bezel 414. The sensor bezel 414 may be coupled or secured to the jack interface 405 of the interconnect cassette 402 via known attachment methods, including but not limited to connection with known fasteners that are extended through openings 422 in the sensor bezel 414 and the jack interface 405 of the interconnect cassette 402. Electrical insulation may be employed as desired or as necessary to avoid short circuits.

As illustrated in FIGS. 8 and 9, in one embodiment the sensor bezel 414 includes opposite end sections 411 and 413, and interface sections 415, 417 extending therebetween. The sections 411, 413, 415 and 417 are coupled to one another with brackets 419 and known fasteners. In different embodiments, the sections 411, 413, 415 and 417 contain respective portions of a continuous printed circuit board defining the sensor strip 416, or contain separate sensor strips electrically coupled to one another.

To provide a sensor output for monitoring and analysis of networked connections, an output cassette 424 is provided in communication with the printed circuit board 416 of the sensor bezel 414. In the illustrated embodiment, the interchangeable output cassette 424 includes a printed circuit board 426 and a number of connectors 428 mechanically and electrically coupled to electronic traces on the printed circuit board 426. The printed circuit board 426 of the output cassette 424 is connected to the printed circuit board 416 of the sensor bezel 414, which, in turn, is electrically connected to the sensor contacts 420. In an exemplary embodiment, the printed circuit board 416 of the sensor bezel 414 includes a known card edge connector 430 which receives the printed circuit board 426 of the output cassette 424.

In one embodiment, the card edge connector 430 is extended through a slot 432 in the jack interface 405 of the interconnect cassette 402 when the sensor bezel 414 is installed, and the output cassette 424 is located behind the jack interface 405 in connection with the edge card connector 430. In an alternative embodiment, other known connection schemes may be employed, including but not limited to the above-described strip pins.

In one embodiment, the output cassette 424 includes an output connector 434 (shown in FIG. 7) coupled to connectors 428 and adapted to output a signal from the printed circuit board 426 to sense, monitor, and analyze network connections. The output connector 434 is positioned adjacent an output opening 436 in the jack interface 405, and as desired, the output connector 426 is accessible through a complementary opening 438 (shown in outline form in FIG. 7). When the opening 438 is punched or otherwise formed into the sensor bezel 414, and more specifically into the end section 411 (shown in FIG. 8) of the sensor bezel 414, the output connector 434 provides an output signal from the front of the sensor bezel 414. In other words, and unlike known interconnects, the output signal may be provided from the front of the jack interface 405 when a connector, plug or cable is coupled to the output connector 434. Additionally, and as desired, the output opening 438 may remain closed as illustrated in FIG. 9, and a sensor output interface may be provided in the rear of interconnect cassette 402 (similar to interface 318 shown in FIG. 3 of interface 322 shown in FIG. 4).

The output cassette 424 is adapted for a desired signal output for connection to a desired network component. For different applications or for connection to different types of equipment, the output cassette 424 may be interchanged with another differently configured output cassette that is better suited or more desirable for a particular application. That is, a given output cassette may be removed and replaced with another output cassette which is better suited or more desirable for a selected application. By providing a number of interchangeable output cassettes 424 that are differently configured, a variety of output signals may be generated to sense, monitor, and analyze network connections with a single sensor bezel 414. In other words, the interchangeable output cassettes provide a variety of output signals without modification of the bezel or the sensor components (i.e., the printed circuit board 416 or the contacts 420). Additionally, by providing front and rear output signal capability, the cassette assembly 400 provides flexibility and versatility in connecting the cassette assembly 400 to another network component or components, such as a sensing component and an analyzing component. Still further, the sensor bezel 414 and sensor contacts 420 provide reliable and secure electrical and mechanical connection to the printed circuit board 416 of the sensor bezel 414 for accurate sensing of network connections.

While the invention has been described in terms of various specific embodiments, those skilled in the art will recognize that the invention can be practiced with modification within the spirit and scope of the claims.

What is claimed is:

1. A connector assembly, comprising:
   a housing comprising a jack interface, said jack interface having a receptacle jack therein, said receptacle jack being configured to receive a plug;
   a sensor bezel removably attachable to said jack interface, said sensor bezel comprising a cavity extending therethrough to allow passage of a plug when inserted into said receptacle jack, said sensor bezel including a circuit board proximate said jack cavity, and at least one sensor contact aligned with, and configured to engage, a sensor probe associated with a plug insertable into said receptacle jack; and
   an output cassette connected to said circuit board, said output cassette configured to generate an output signal through a front of said sensor bezel.

2. The connector assembly of claim 1, wherein said circuit board includes a card edge connector.

3. The connector assembly of claim 1, wherein said at least one sensor contact comprises a plate.

4. The connector assembly of claim 1, further comprising an interchangeable output cassette connected to said circuit board, said output cassette configured to generate a desired output signal for monitoring a connection to said receptacle jack.

5. The connector assembly of claim 1, wherein said sensor contact is positioned between said sensor bezel and said jack interface.

6. The connector assembly of claim 1, wherein said sensor bezel comprises an output opening.

7. The connector assembly of claim 1, wherein said housing is an interconnect cassette comprising signal and sensor input/output (I/O) interfaces located on at least one of a front and rear surface of said interconnect cassette, said signal and sensor I/O interfaces electrically connecting to said receptacle jacks and said circuit board, respectively.

8. The connector assembly of claim 1, wherein said housing is electrically connected to a network component and a sensing component through said circuit board.

9. An interconnect cassette configured to electrically communicate with a network component and a sensing component, comprising:
   a housing comprising a jack interface, said jack interface having a plurality of receptacles formed therein, each of said plurality of receptacles being configured to receive a plug of a patch cord;
   a sensor bezel removably attachable to said jack interface, said sensor bezel configured to engage said jack interface and having at least one cavity extending therethrough to allow passage of a plug when inserted into one of said receptacles, said sensor bezel including a circuit board and a plurality of sensor contacts electrically connected to said circuit board, each of said sensor contacts being aligned with, and configured to engage, a sensor probe associated with a plug insertable into said receptacle; and
   an interchangeable output cassette coupled to said circuit board, said output cassette adapted to provide a desired output signal to a sensing component.

10. The connector assembly of claim 9, wherein said circuit board comprises a card edge connector.

11. The connector assembly of claim 9, wherein said sensor contacts are separately provided from said bezel.

12. The connector assembly of claim 9, wherein said sensor contacts comprise conductive plates in electrical contact with the circuit board.

13. The connector assembly of claim 9, wherein said sensor bezel comprises an output opening.

14. The connector assembly of claim 9, further comprising an output cassette, said output cassette comprising an output connector, said output cassette positioned to be accessible through said sensor bezel.

15. The connector assembly of claim 9, wherein said circuit board is overmolded in said sensor bezel.

16. The connector assembly of claim 9, wherein said connector assembly is at least one of electrically and optically connected to a network component and a sensing component through said circuit board.

17. A sensor bezel configured to be removably secured to a network connection component having a plurality of receptacle jacks formed therein, aligning with, and configured to engage sensor probes associated with plugs, each of which may be inserted into one of the receptacle jacks, said sensor bezel comprising:
   a circuit board;
   a bezel holding the circuit board;
   at least one jack cavity proximate the circuit board;
   a plurality of sensor contacts configured to be positioned proximate respective receptacle jacks; and
   an interchangeable output cassette generating a signal dependant upon the connections to the receptacle jacks.

18. The sensor bezel of claim 17, wherein said output cassette is configured to generate said signal through the front, or rear, of said sensor bezel.

19. The sensor bezel of claim 17, wherein said circuit board includes a card edge connector.

20. The sensor bezel of claim 17, wherein each of the sensor contacts are metallic plates, said plates located between said sensor bezel and a jack interface of the network component.

\* \* \* \* \*